Jan. 10, 1956     W. A. THOMAS     2,730,241
FILTERS
Filed Feb. 9, 1953     2 Sheets-Sheet 1
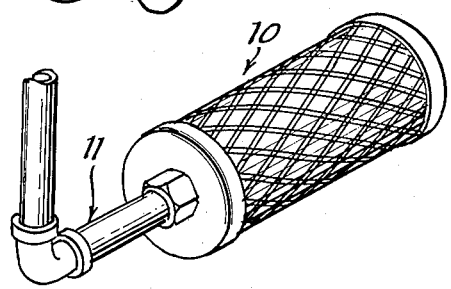
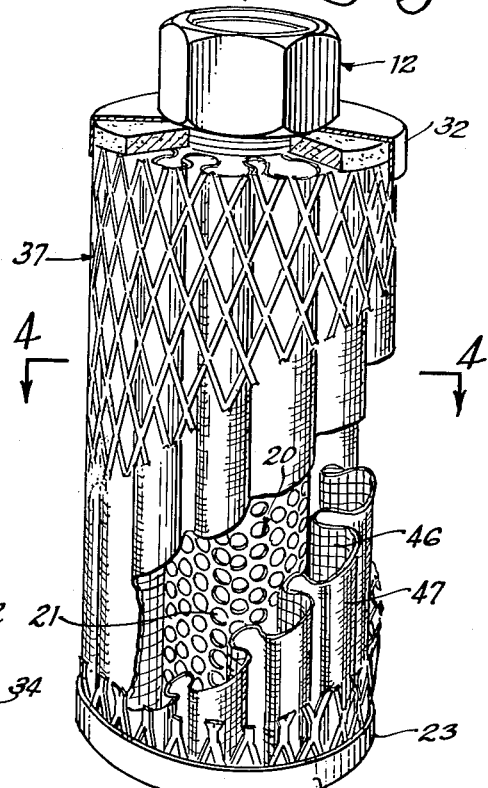
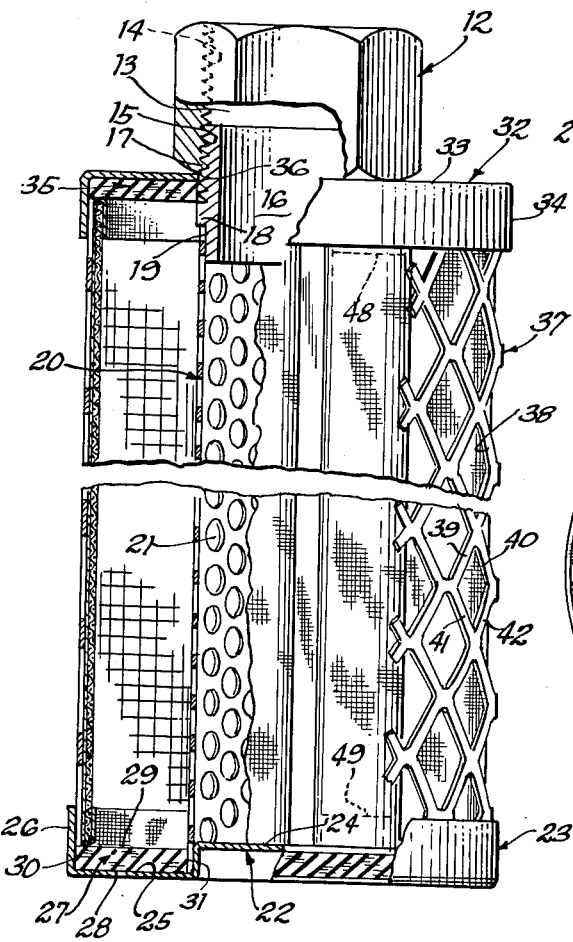
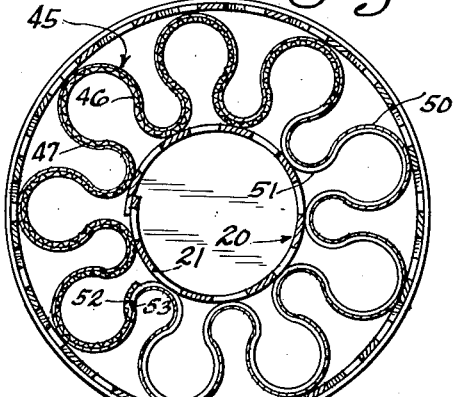
INVENTOR.
William A. Thomas
BY
Robert H. Wendt
Attorney Jan. 10, 1956   W. A. THOMAS   2,730,241
FILTERS
Filed Feb. 9, 1953   2 Sheets-Sheet 2
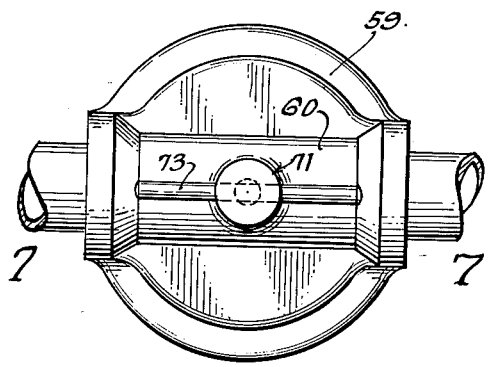
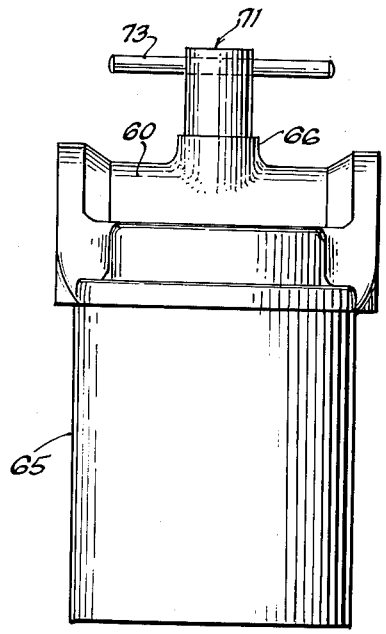
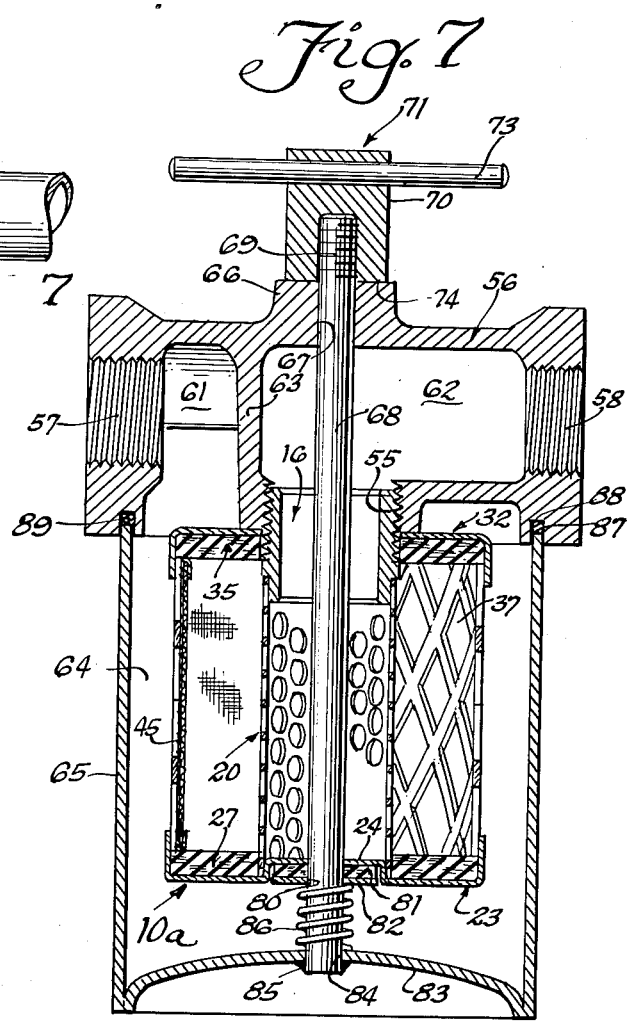
INVENTOR.
William A. Thomas
BY
Robert H. Wendt
Attorney

United States Patent Office 2,730,241
Patented Jan. 10, 1956

2,730,241

FILTERS

William A. Thomas, Chicago, Ill., assignor to Marvel Engineering Company, Chicago, Ill., a corporation of Illinois Application February 9, 1953, Serial No. 335,710

2 Claims. (Cl. 210—165)

The present invention relates to filters, and is particularly concerned with the type of filters adapted to be used for filtering hydraulic oils, lubricants, coolants, emulsions, and for water applications.

One of the objects of the invention is the provision of an improved filter construction which is simple, sturdy, and which provides a greatly increased area of active filtering surface over devices of the prior art, while having a relatively small size.

Another object of the invention is the provision of an improved filter which is simple, efficient, durable, adapted to be cleaned easily, and adapted to be used at high rates of flow and at high or low pressures for long periods of time without necessity for repair or replacement of any of its parts.

Another object of the invention is the provision of an improved filter of the class described which is adapted to be manufactured at a very low cost and thus placed within the range of a vast number of users, and in which the filtering unit is adapted to be cleaned and re-used many times so that under ordinary conditions of use there is no need for replacing any of the parts of the filter.

Other objects and advatnages of the invention will be apparent from the following description and the accompanying drawings, in which similar characters of reference indicate similar parts throughout the several views.

Referring to the two sheets of drawings accompanying this specification,

Fig. 1 is a view in perspective of the sump type of filter, shown in connection with a single suction pipe;

Fig. 2 is a front elevational view of a filter, partially broken away to show its internal structure;

Fig. 3 is a sectional view, taken on the plane of the line 3—3 of Fig. 2 on a larger scale;

Fig. 4 is a horizontal sectional view, taken on the plane of the line 4—4 of Fig. 2, looking in the direction of the arrows;

Fig. 5 is a top plan view of the line type of filter embodying my invention;

Fig. 6 is a side elevational view;

Fig. 7 is a sectional view, taken on the plane of the line 7—7 of Fig. 5, looking in the direction of the arrows.

Referring to Figs. 1–4, 10 indicates in its entirety the sump type filter which is to be installed immersed in oil or other liquid in a sump, and which is therefore provided with an outlet pipe 11, to which suction is applied by a suitable pump for drawing the liquid through the filter.

Referring to Figs. 2 and 3, 12 indicates a coupling member which is in the form of a hexagonal metal member, having a through bore 13 provided with inwardly tapering threads 14 and 15 extending into both ends. Thus the coupling is adapted to make a tight joint with the pipe 11 and with the nipple 16, which has outwardly tapering threads 17.

The nipple 16 preferably has an inwardly extending annular shoulder 18 at the end of its threads and is provided with a reduced portion 19 for receiving a perforated centering tube 20. The centering tube 20 fits on the reduced portion 19, to which it is soldered, brazed, or spot welded; and the centering tube comprises a rectangular sheet of sheet metal, which is provided with regularly spaced circular apertures 21, and which has its edges overlapped after having been bent to a cylinder and spot welded at spaced points.

The centering tube serves as a gathering conduit for receiving and conducting the filtered liquid to the nipple 16, coupling 12, and pipe 11.

At its lower end the filtering tube is fitted around an inwardly extending cup formation 22 on the bottom cap 23 and spot welded to the outside of the cup formation 22, which is also substantially cylindrical.

The cap 23 has a circular portion 24, closing the lower end of the centering tube, and an annular bottom formation 25 bordered by a cylindrical retaining flange 26. The inner cup formation 22, annular bottom 25, and the retaining flange 26 form an annular trough or groove for receiving a combination washer made of a composition containing cork and an artificial rubber, such as that having the trade name "neoprene."

The resilient washer 27 is preferably rectangular in cross section and has a plane bottom 28, a plane top 29, the outer cylinder edge 30, and the inner circular edge 31.

The centering tube also supports an upper cap 32, comprising a cylindrical cup shaped member having a plane upper wall 33 and a cylindrical border flange 34 and provided with a central aperture 36 for passing the threaded nipple 16. The upper cap 32 also contains a resilient washer 35 of the same shape and structure as described for the washer 27.

The washer is adapted to fit tightly against the outer flanges 34 and 26 and also against the centering tube 20 or nipple 16 to prevent any leakage at these points.

The two caps 32 and 23 are adapted to receive and secure an expanded metal protective housing 37. This comprises a rectangular piece of expanded metal, having the diamond shaped apertures 38 bordered by the diagonally extending portions 39, 40, 41, 42, all joined to adjacent similar portions.

This expanded metal is flattened out so that all of its parts are in the same plane; and a rectangular piece of it is bent to cylindrical shape with overlapping and registering portions 43, 44, which are welded together at regularly spaced points, with the diamond shaped openings 38 in registry.

The cylindrical protective housing 37 fits inside the two caps 23 and 32, where it is retained by the flanges 26 and 34; and its end edges engage the gaskets 27 and 35.

The protective housing 37 and caps 32 and 33 enclose the filter element 45, which includes an inner layer of coarse wire mesh 46 and an outer layer of Monel metal gauze or screen 47. The filter element 45 is made out of a sheet of rectangular coarse screen and a larger, that is, longer, sheet of Monel metal gauze or screen, preferably of relatively fine weave, such as 100 mesh wire cloth, having openings of the dimension of .005 of an inch or five thousandths of an inch.

Coarser or finer mesh may be used for special purposes. The two sheets of Monel metal wire cloth and coarse mesh are superimposed upon each other, with the coarse mesh inside; and the coarse mesh is bent upwardly on the other side and downwardly at both ends, effectively clamping the two sheets together. The upper and lower edges of the wire gauze are indicated at 48, 49 in dotted lines.

The combined filter sheet is then shaped substantially as shown in Fig. 4, with a multiplicity of outer partially cylindrical portions 50 and a multiplicity of inner partially cylindrical portions 51, these being alternately formed and of such size that the filter element 45 fits inside the housing 37 and fits outside the perforated centering tube 20.

The two adjacent edges 52, 53 are overlapped and spot welded together simultaneously, preferably along one of the radial portions of the filter element. The coarse wire mesh reinforces and supports the wire gauze and prevents its collapse under heavy suction or external pressure.

The cylindrical formations greatly increase the amount of surface of the filter element over the type having straight radial portions.

The parts are then assembled together as follows: The filter element is slid over the centering tube 20 inside the lower cap 23 against the gasket 27; and the outer housing 37 is placed over the filter element 45 inside the cap 23, engaging the gasket 27.

The upper cap 32 is placed over the upper edges of the filter element 45 and housing 37, the edges of which both engage the resilient gasket 35. The coupling 12 is threaded on the needle 16, clamping the cap 32 against the filter element and housing so that leakage around the ends of the filter element is positively prevented by gaskets 27 and 35.

Referring to Figs. 5–7, these views show the line type of filter, employing substantially the same filter element.

The filter element 10a includes the same centering tube 20, upper and lower caps 32 and 23, upper and lower gaskets 35 and 27, a protective housing 37, and the Monel metal wire cloth 45 reinforced by coarse wire mesh, as previously described.

The nipple 16 has its upper end threaded into a threaded bore 55 in a head casting 56, which is provided with a threaded inlet 57 and a threaded outlet 58. The head casting 56 has a substantially circular body 59 provided on its upper side with a substantially cylindrical portion 60 extending from the inlet to the outlet; but the inlet space 61 is separated from the outlet space 62 by a partition 63 on the left side of the nipple in Fig. 7. The inlet space 61 communicates with the interior space 64 of a cylindrical housing member 65, while the outlet space 62 communicates with the interior of the nipple 16 and the interior of the centering tube 20.

The head casting 56 has an upwardly extending cylindrical boss 66, which is centrally located and provided with a central bore 67 for passing a threaded rod 68. The rod 68 has an upper threaded portion 69 for receiving the hub 70 of a clamping member 71, having a threaded bore 72.

The clamping member 71 has a transverse handle pin 73 and serves as a hand nut, the lower surface 74 of which engages the boss 66 on the head casting 56.

The lower cap 23 is provided with a through bore 80 for passing the rod 68; and the lower cap 23 has a cup formation 24 for receiving another gasket of similar material 81, fitting around the rod and provided with a washer 82.

The outer housing 65 comprises a sheet metal cylindrical member, the outer wall of which is formed of a rectangular sheet of material bent to cylindrical form, with its abutting edges welded together. Its lower edge is welded to a concave bottom plate 83, which closes the lower end of housing 65; and the bottom plate 83 is provided with a through bore 84, in which the rod 68 is received and welded in place at 85.

A spring 86 is compressed between the washer 82 and the bottom plate 83 and holds all of the parts of the filter assembly in tight engagement with each other.

The upper open end of housing 65 has its edge 87 received in an annular groove 88 and engages an annular round rubber gasket 89 to form a liquid-tight joint between housing 65 and head casting 56.

The operation of both types of filter is substantially the same. Liquid enters the head casting (Fig. 7) at 57 and passes through space 61 into the interior 64 of housing 65 to be filtered. The dirty liquid passes through the Monel metal screen 45, which is reinforced by the coarse wire mesh screen; and its impurities, in the form of solids are screened out; and the filtrate passes into the centering tube 20.

From the centering tube 20 in Fig. 7 the filtrate passes through nipple 16 into outlet space 65 and emerges at outlet 58. In Fig. 1 the filtrate passes out through the pipe 11.

It will thus be observed that I have invented an improved construction of filter in which a maximum amount of filter surface is provided in a minimum amount of space.

The present filter is simple, efficient, durable, adapted to be cleaned easily, and may be used at high rates of flow and high or low pressures for long periods of time without necessity for repair or replacement of any of its parts.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A filter assembly comprising a circular head casting formed with an integral transverse partially cylindrical portion having a pair of internally pipe threaded conduits aligned with each other, said casting having a central hub with a plane end, a through bore, an elongated bolt in said bore, and having a threaded end, a cylindrical threaded member having an axial threaded bore receiving said threaded end, said member having a plane lower end, and having a transverse pin, said casting having a circular bottom edge provided with a circular groove of rectangular cross-section, an O-ring in said latter groove, said bolt being welded to the inside center of the bottom of said housing, and a filter unit mounted on said bolt in said housing, and having an internal conduit communicating with one of said threaded conduits and its exterior surface in said housing communicating with the other of said threaded conduits.

2. A filter assembly comprising a circular head casting formed with an integral transverse partially cyindrical portion having a pair of internally pipe threaded conduits aligned with each other, said casting having a central hub with a plane end, a through bore, an elongated bolt in said bore, and having a threaded end, a cylindrical threaded member having an axial threaded bore receiving said threaded end, said member having a plane lower end, and having a transverse pin, said casting having a circular bottom edge provided with a circular groove of rectangular cross-section, an O-ring in said latter groove, said bolt being welded to the inside center of the bottom of said housing, and a filter unit mounted on said bolt in said housing, and having an internal conduit communicating with one of said threaded conduits and its exterior surface in said housing communicating with the other of said threaded conduits, said internal conduit having a threaded end threaded into a threaded bore in the bottom of said casting, metal caps carried by both ends of said internal conduit and facing toward each other, packings carried by each cap, and a filter element located between said caps about said internal conduit, and comprising a sheet of coarse screen and a sheet of fine screen overlapping the coarse screen and bent over the edges of the coarse screen and gripping it with its overlapping edges to form a screen assembly, said screen assembly being bent to sinuous form, with radial joining inner and outer partially cylindrical portions, the partially cylindrical screen portions extending over more than one half a cylinder, and the outer cylindrical portions being larger than the inner cylindrical portions, making the radial portions of elongated open S shape, increasing the available screen area.

References Cited in the file of this patent

UNITED STATES PATENTS

| 1,953,759 | Hurst | Apr. 3, 1934 |
| 2,173,978 | Pennebaker | Sept. 26, 1939 |
| 2,413,991 | Newman | Jan. 7, 1947 |
| 2,439,936 | Kasten | Apr. 20, 1948 |
| 2,468,862 | Briggs | May 3, 1949 |
| 2,544,269 | Le Clair | Mar. 6, 1951 |